United States Patent
Harada et al.

(10) Patent No.: US 9,451,127 B2
(45) Date of Patent: Sep. 20, 2016

(54) IMAGE PROCESSING APPARATUS AND NON-TRANSITORY COMPUTER READABLE RECORDING MEDIUM FOR ENCODING HALFTONE IMAGE

(71) Applicant: KYOCERA Document Solutions Inc.

(72) Inventors: Hiroyuki Harada, Osaka (JP); Sota Nanbu, Osaka (JP)

(73) Assignee: Kyocera Document Solutions Inc.

( * ) Notice: Subject to any disclaimer, the term of this patent is extended or adjusted under 35 U.S.C. 154(b) by 0 days.

(21) Appl. No.: 14/803,322

(22) Filed: Jul. 20, 2015

(65) Prior Publication Data

US 2016/0026906 A1  Jan. 28, 2016

(30) Foreign Application Priority Data

Jul. 25, 2014  (JP) ................. 2014-152409

(51) Int. Cl.
*G06F 15/02* (2006.01)
*H04N 1/40* (2006.01)

(52) U.S. Cl.
CPC ..................... *H04N 1/40* (2013.01)

(58) Field of Classification Search
None
See application file for complete search history.

(56) References Cited

U.S. PATENT DOCUMENTS

| 5,524,067 | A | * | 6/1996 | Miyake | H04N 1/41 348/397.1 |
| 5,949,555 | A | * | 9/1999 | Sakai | H04N 1/40062 358/426.04 |
| 6,529,636 | B1 | * | 3/2003 | Aono | H04N 19/645 375/240.11 |
| 6,868,183 | B1 | | 3/2005 | Kodaira et al. | |

FOREIGN PATENT DOCUMENTS

| JP | H07-037036 | 2/1995 |
| JP | 2000-295468 | 10/2000 |

* cited by examiner

*Primary Examiner* — Ted Barnes

(57) ABSTRACT

An image processing apparatus includes an area extracting unit, a specific halftone dot area detecting unit, and an encoding unit. The area extracting unit extracts a halftone dot area from an image. The specific halftone dot area detecting unit detects a specific halftone dot area, the specific halftone dot area being the extracted halftone dot area that includes a character and of which a variation range in a distribution of luminance and hue is less than a predetermined range. The encoding unit encodes the specific halftone dot area in an encoding manner different from an encoding manner for the halftone dot area other than the specific halftone dot area, the encoding manner for the specific halftone dot area providing higher image quality after encoding than image quality provided by the encoding manner for the halftone dot area other than the specific halftone dot area.

4 Claims, 4 Drawing Sheets

FIG. 4A
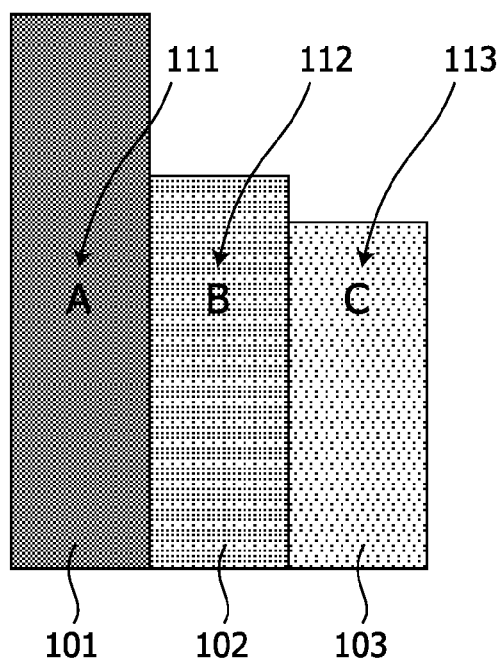
FIG. 4B
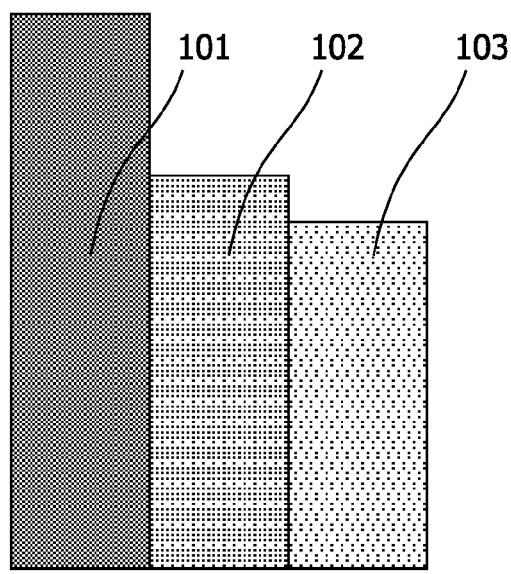
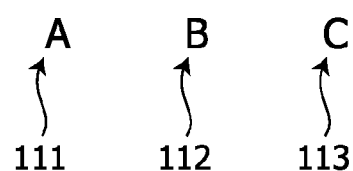

IMAGE PROCESSING APPARATUS AND NON-TRANSITORY COMPUTER READABLE RECORDING MEDIUM FOR ENCODING HALFTONE IMAGE

CROSS-REFERENCE TO RELATED APPLICATIONS

This application relates to and claims priority rights from Japanese Patent Application No. 2014-152409, filed on Jul. 25, 2014, the entire disclosures of which are hereby incorporated by reference herein.

BACKGROUND

1. Field of the Present Disclosure

The present disclosure relates to an image processing apparatus and a non-transitory computer readable recording medium storing an image processing program.

2. Description of the Related Art

An image processing apparatus detects an area such as photograph, figure, table or halftone dots in an image.

Further, a system extracts a circumscribed rectangle of black connection pixels in an image, and classifies a property of the rectangle into a character, a ruled line, a table, a figure, a graph, or the like on the basis of the shape of the circumscribed rectangle and the data of its inside.

For example, for generating a highly compressed PDF (Portable Document Format) file, areas in an image are classified into predetermined plural properties, image data of each area is encoded and compressed in a manner (a resolution, an encoding method, and the like) corresponding to its property.

When encoding and compressing the image data of each area in the image in such manner, a graph is extracted as a halftone dot area or a table area and therefore the graph is encoded and compressed in a manner suitable to a halftone dot area or a table area. Consequently, if a graph includes a small character, the image quality of the small character is dropped by encoding and compressing in such manner and the visibility of the small character is dropped. FIGS. 4A and 4B show examples of a graph including a small character. In some cases, halftone dot areas 101 to 103 in a graph such as a bar graph, a circle graph or the like include characters 111 to 113 as shown in FIG. 4A, and halftone dot areas 101 to 103 in a graph such as a bar graph, a circle graph or the like have characters 111 to 113 in neighborhood thereof as shown in FIG. 4B.

SUMMARY

An image processing apparatus according to an aspect of the present disclosure includes an area extracting unit, a specific halftone dot area detecting unit, and an encoding unit. The area extracting unit is configured to extract a halftone dot area from an image. The specific halftone dot area detecting unit is configured to detect a specific halftone dot area, the specific halftone dot area being the extracted halftone dot area that includes a character and of which a variation range in the distribution of luminance and hue is less than a predetermined range. The encoding unit is configured to encode the specific halftone dot area in an encoding manner different from an encoding manner for the halftone dot area other than the specific halftone dot area, the encoding manner for the specific halftone dot area providing higher image quality after encoding than image quality provided by the encoding manner for the halftone dot area other than the specific halftone dot area.

A non-transitory computer readable recording medium according to an aspect of the present disclosure stores an image processing program. The image processing program causing a computer to act as an area extracting unit, a specific halftone dot area detecting unit, and an encoding unit. The area extracting unit is configured to extract a halftone dot area from an image. The specific halftone dot area detecting unit is configured to detect a specific halftone dot area, the specific halftone dot area being the extracted halftone dot area that includes a character and of which variation range of distribution of luminance and hue is less than a predetermined range. The encoding unit is configured to encode the specific halftone dot area in an encoding manner different from an encoding manner for the halftone dot area other than the specific halftone dot area, the encoding manner for the specific halftone dot area providing higher image quality after encoding than image quality provided by the encoding manner for the halftone dot area other than the specific halftone dot area These and other objects, features and advantages of the present disclosure will become more apparent upon reading of the following detailed description along with the accompanied drawings.

BRIEF DESCRIPTION OF THE DRAWINGS

FIGS. 4A and 4B show examples of a graph including a small character.

DETAILED DESCRIPTION

Hereinafter, embodiments according to aspects of the present disclose will be explained with reference to drawings.

Embodiment 1.

Figure 1:
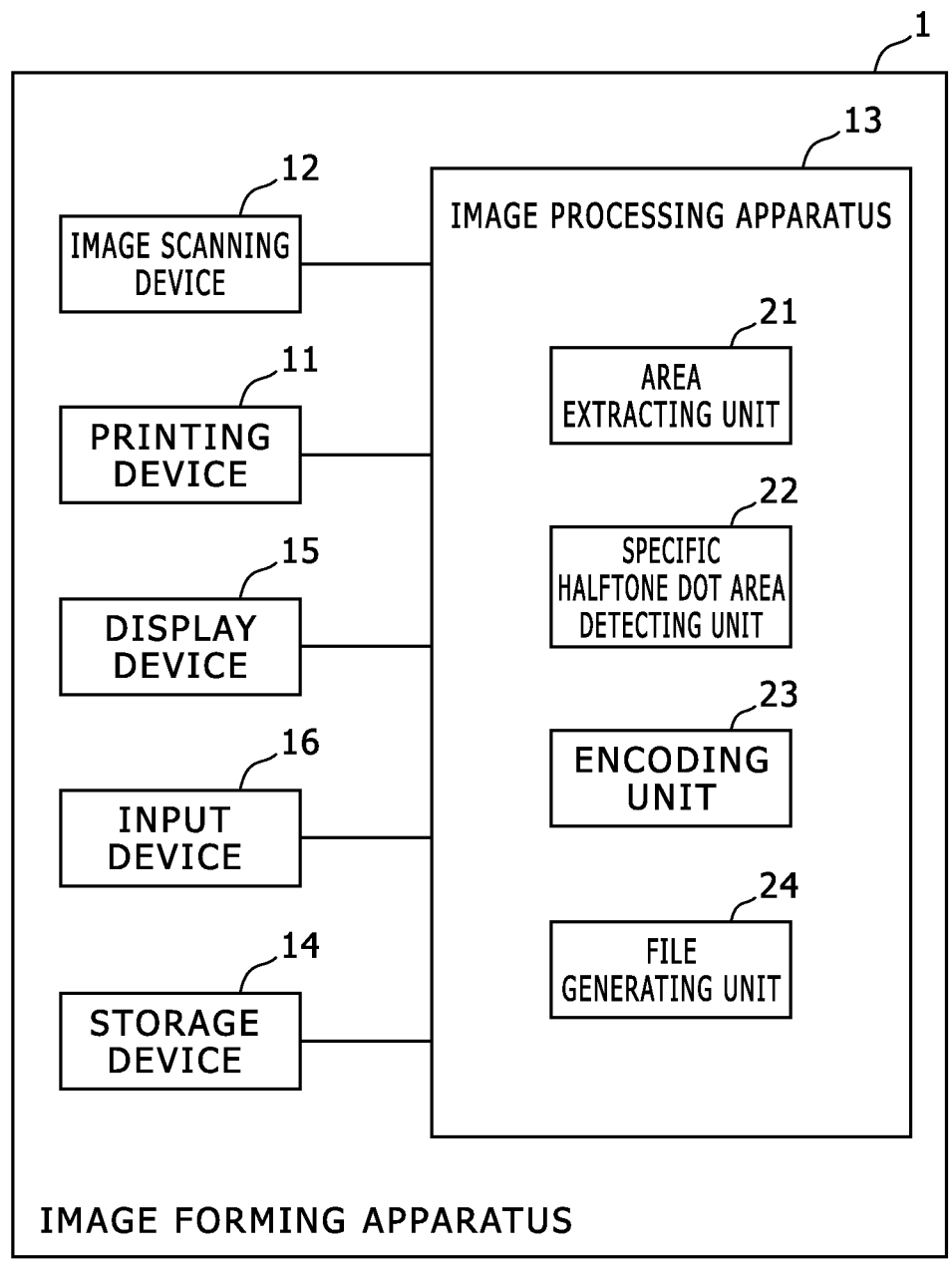
FIG. 1 shows a block diagram that indicates a configuration of an image forming apparatus that includes an image processing apparatus according to an embodiment of the present disclosure.

FIG. 1 shows a block diagram that indicates a configuration of an image forming apparatus that includes an image processing apparatus according to an embodiment of the present disclosure. The image forming apparatus 1 is a multi function peripheral, but may be a scanner, a copier or the like.

The image forming apparatus 1 includes a printing device 11, an image scanning device 12, an image processing apparatus 13, a storage device 14, a display device 15, and an input device 16.

The printing device 11 is an internal device that prints a document image based on image data after sorts of image processing performed by the image processing apparatus in an electrophotographic process using toner of CMYK (Cyan, Magenta, Yellow, and Black) colors.

Further, the image scanning device 12 is an internal device that optically scans a document image of a document and generates image data of the document image as RGB data.

Furthermore, the image processing apparatus 13 performs image processing such as color adjustment, color conversion and so forth for image data such as the image data generated by the image scanning device 12.

Furthermore, the storage device 14 is a non volatile rewritable storage device such as a flash memory and stores sorts of data and programs.

The image processing apparatus 13 is embodied with an ASIC (Application Specific Integrated Circuit), a computer or the like, and includes an area extracting unit 21, a specific halftone dot area detecting unit 22, an encoding unit 23, and a file generating unit 24.

The area extracting unit 21 extracts a halftone dot area, a table area, a character area or the like from an image based on raster image data.

Regarding a halftone dot area, for example, the area extracting unit 21 detects a cyclic halftone dot pattern, detects an edge of the halftone dot pattern, and extracts the internal area from the edge as a halftone dot area.

Regarding a table area, for example, the area extracting unit 21 detects ruled lines, and extracts as a table area a rectangle circumscribed to a set of the detected ruled lines.

The specific halftone dot area detecting unit 22 detects a "specific halftone dot area" among the extracted halftone dot areas extracted by the area extracting unit 21. The "specific halftone dot area" is a halftone dot area (a) that includes a character and (b) of which a variation range in the distribution of luminance (i.e. the dot density of the halftone dot and the dot size of the halftone dot) and hue is less than a predetermined range. In other words, the "specific halftone dot area" is a halftone dot area (a) that includes a character and (b) of which luminance and hue are substantially uniform.

The encoding unit 23 encodes the specific halftone dot area in an encoding manner (i.e. a resolution, an encoding method and/or the like) different from an encoding manner for the halftone dot area other than the specific halftone dot area. The encoding manner for the specific halftone dot area provides higher image quality after encoding than image quality provided by the encoding manner for a halftone dot area other than the specific halftone dot area.

For example, the encoding unit 23 encodes the specific halftone dot area at a higher resolution (e.g. 600 dpi) than a resolution (e.g. 300 dpi) of a halftone dot area other than the specific halftone dot area.

Further, the encoding unit 23 may encode the specific halftone dot area in an encoding method different from an encoding method for a halftone dot area other than the specific halftone dot area.

For example, if a normal halftone dot area is encoded in JPEG (Joint Photographic Experts Group) method, for a specific halftone dot area, an image with a higher resolution is encoded using JPEG, the encoding method is changed to a loss-less method such as GIF (Graphics Interchange Format), PNG (Portable Network Graphics) or the like, or the value of the quantization parameter of JPEG is lowered.

Further, in Embodiment 1, if a character size of the character in the specific halftone dot area is less than a predetermined threshold value, then the specific halftone dot area detecting unit 22 separates the character from the specific halftone dot area. The encoding unit 23 encodes the specific halftone dot area in which the character has been removed and the separated character independently in respective encoding methods different from each other. For the specific halftone dot area in which the character has been removed, a resolution and an encoding method for a halftone dot area are used; and for the separated character, a resolution corresponding to the character size and an encoding method for a character area are used.

Further, in Embodiment 1, the specific halftone dot area detecting unit 22 detects the specific halftone dot area in the halftone dot area overlapping with the extracted table area, and the encoding unit 23 encodes the table area including the specific halftone dot area in an encoding manner (i.e. a resolution, an encoding method, and/or the like). The encoding manner for the table area including the specific halftone dot area provides higher image quality after encoding than image quality provided by an encoding manner for the table area not including the specific halftone dot area.

The file generating unit 24 generates a highly compressed PDF file of which plural layers are respective image data of plural area types encoded in encoding manners suitable to the area types by the encoding unit 23.

The following part explains a behavior of the aforementioned image processing apparatus.

The encoding unit 23 encodes image data of the area extracted by the area extracting unit 21 in an encoding manner corresponding to an area type of the area.

It should be noted that the halftone dot area is classified into a specific halftone dot area or another normal halftone dot area by the specific halftone dot area detecting unit 22, and the specific halftone dot area and the normal halftone dot area are encoded in respective encoding manners different from each other. In this process, a part overlapping with a table area in a halftone dot area is processed as the table area, and excluded from the classification process for this halftone dot area.

Further, the table area is classified into a table area including a specific halftone dot area or another normal table area by the specific halftone dot area detecting unit 22, and the table area including a specific halftone dot area and the normal table area are encoded in respective encoding manners different from each other.

The file generating unit 24 generates a highly compressed PDF file of which plural layers are respective image data of plural area types encoded in encoding manners suitable to the area types.

Figure 2:
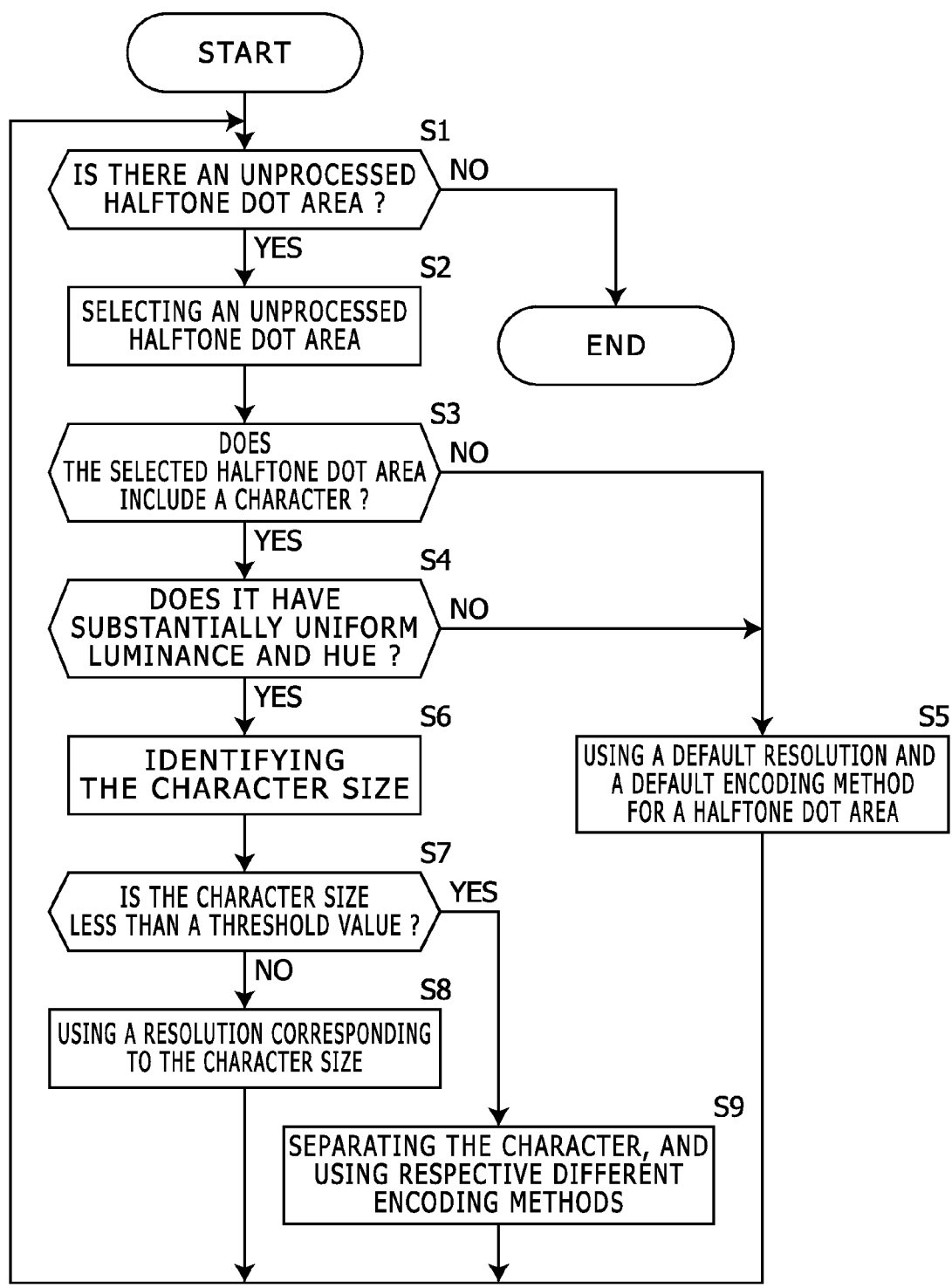
FIG. 2 shows a flowchart that explains a classification process for a halftone dot area in the image processing apparatus 13 of Embodiment 1.

Here the classification process for a halftone dot area is explained. FIG. 2 shows a flowchart that explains a classification process for a halftone dot area in the image processing apparatus 13 of Embodiment 1.

The specific halftone dot area detecting unit 22 identifies whether there is an unprocessed halftone dot area (i.e. a halftone dot area for which the process mentioned below has not been performed yet) among the halftone dot areas extracted from an image (in Step S1).

If there is an unprocessed halftone dot area, then the specific halftone dot area detecting unit 22 selects an unprocessed halftone dot area (in Step S2), and identifies whether the selected halftone dot area includes a character and has substantially uniform luminance and hue or not (in Steps S3 and S4).

If the selected halftone dot area does not include a character or if the selected halftone dot area does not have substantially uniform luminance and hue, then for this halftone dot area, the specific halftone dot area detecting unit 22 causes the encoding unit 23 to use a default resolution and a default encoding method for a halftone dot area (in Step S5).

Contrarily, if the selected halftone dot area includes a character and has substantially uniform luminance and hue, then the specific halftone dot area detecting unit 22 determines that this halftone dot area is a specific halftone dot area, and identifies the character size of a character included in this halftone dot area (in Step S6).

Subsequently, the specific halftone dot area detecting unit 22 identifies whether the identified character size is less than a threshold value or not (in Step S7). If the identified character size is not less than the threshold value, then for this halftone dot area, the specific halftone dot area detecting unit 22 causes the encoding unit 23 to use a resolution and an encoding method for a specific halftone dot area (in Step S8). Here if a predetermined range of a neighborhood area around this halftone dot area includes a character area, then for this character area, the specific halftone dot area detecting unit 22 may cause the encoding unit 23 to use a resolution and encoding method for a specific halftone dot area.

Contrarily, if the identified character size is less than a threshold value, then the specific halftone dot area detecting unit 22 separates the identified character from this halftone dot area, and causes the encoding unit 23 to use respective encoding methods different from each other for the halftone dot area from which the character has been separated and for the character (in Step S9).

After finishing the process of Step S5, S8 or S9, returning to Step S1, a next halftone dot area is selected and processed in the same manner until all halftone dot areas extracted in the image are processed in the same manner.

Consequently, if in an image a graph detected as a halftone dot area includes a character, then such graph is extracted as a specific halftone dot area, and in the encoding, dropping the image quality of the character is restrained. For example, in case of a graph as shown in FIG. 4A, halftone dot areas 101 to 103 in the graph are extracted as specific halftone dot areas, and dropping the image quality of characters 111 to 113 is restrained. In addition, in case of a graph as shown in FIG. 4B, characters 111 to 113 at the outside of halftone dot areas 101 to 103 are extracted and processed as character areas.

Figure 3:
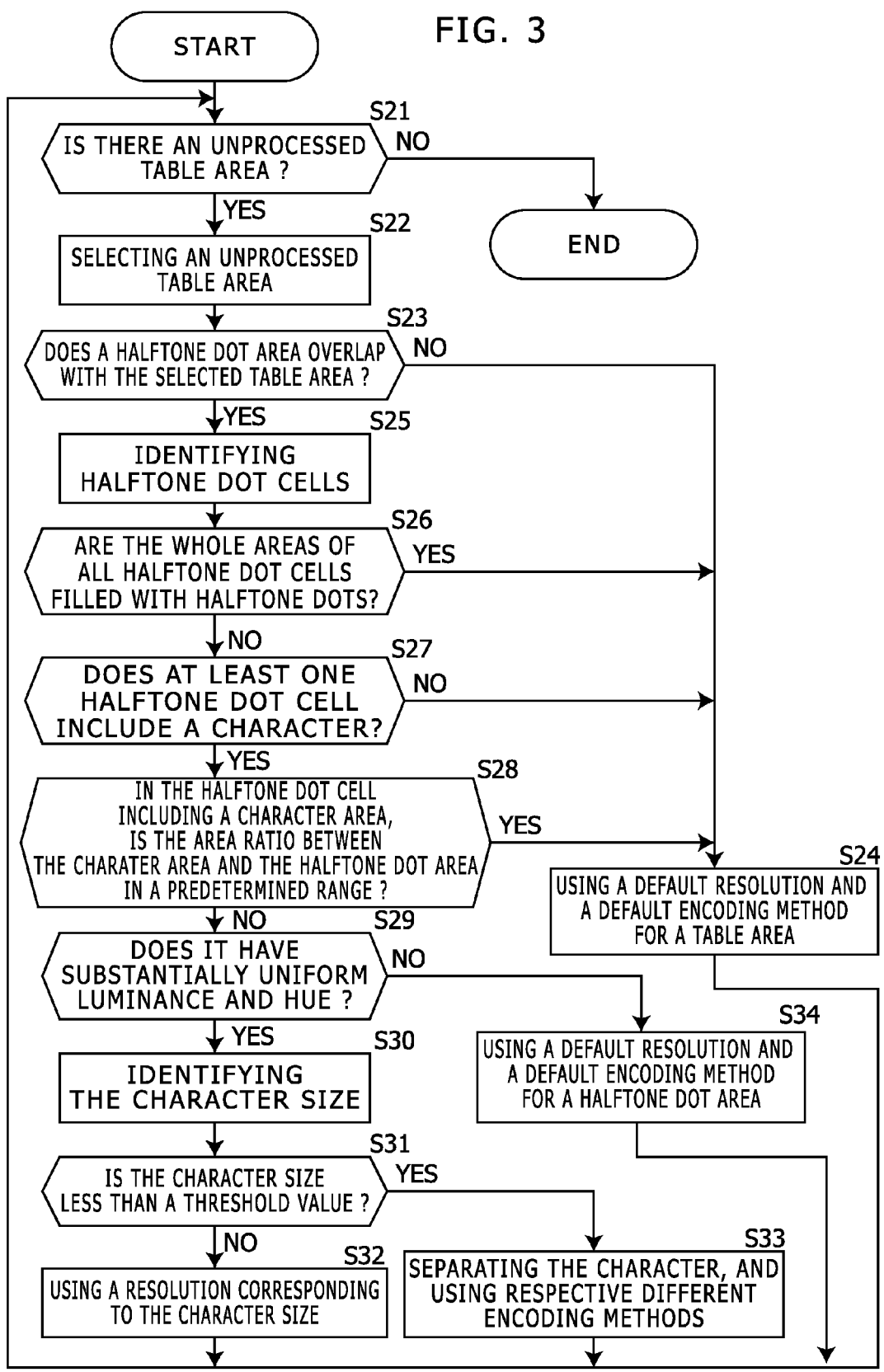
FIG. 3 shows a flowchart that explains a classification process for a table area in the image processing apparatus 13 of Embodiment 1.

Here the classification process for a table area is explained. FIG. 3 shows a flowchart that explains a classification process for a table area in the image processing apparatus 13 of Embodiment 1.

The specific halftone dot area detecting unit 22 identifies whether there is an unprocessed table area (i.e. a table area for which the process mentioned below has not been performed yet) among the halftone dot areas extracted from an image (in Step S21).

If there is an unprocessed table area, then the specific halftone dot area detecting unit 22 selects an unprocessed table area (in Step S22), and identifies whether a halftone dot area extracted from the image overlaps with the selected table area or not (in Step S23).

If a halftone dot area extracted from the image does not overlap with the selected table area, then the specific halftone dot area detecting unit 22 determines that this table area does not include any specific halftone dot areas, and causes the encoding unit 23 to use a default resolution and a default encoding method for a table area as an encoding manner for this table area (in Step S24).

Contrarily, if a halftone dot area extracted from the image overlaps with the selected table area, then the specific halftone dot area detecting unit 22 estimates cells (i.e. rectangle areas having the same shape) in the table area on the basis of the detected ruled lines, and identifies a cell including halftone dots (i.e. a cell that a halftone dot area overlaps with at least a part of the cell, hereinafter called "halftone dot cell") among the cells in the table area (in Step S25).

Subsequently, the specific halftone dot area detecting unit 22 identifies whether the whole areas in all of the identified halftone dot cells are halftone dot areas or not (in Step S26).

If the whole areas in all of the identified halftone dot cells are halftone dot areas, then the specific halftone dot area detecting unit 22 determines that this table area does not include any specific halftone dot areas, and causes the encoding unit 23 to use a default resolution and a default encoding method for a table area as an encoding manner for this table area (in Step S24).

Contrarily, if at least one of the identified halftone dot cells partially includes a halftone dot area, (i.e. if a part of at least one of the halftone dot cells is not a halftone dot area), then the specific halftone dot area detecting unit 22 identifies whether at least one of the halftone dot cells includes a character or not (in Step S27).

If none of the halftone dot cells includes a character, then the specific halftone dot area detecting unit 22 determines that this table area does not include any specific halftone dot areas, and causes the encoding unit 23 to use a default resolution and a default encoding method for a table area as an encoding manner for this table area (in Step S24).

Contrarily, if in Step S27 it is identified that at least one of the halftone dot cells includes a character, then the specific halftone dot area detecting unit 22 identifies whether regarding every halftone dot cell including a character, the cell has the area ratio between its character area and its halftone dot area in a predetermined range or not (in Step S28).

In this process, the area ratio between the character area and the halftone dot area may be the area ratio between the circumscribed rectangle of the character area and the halftone dot area. Further, the aforementioned predetermined range is set as a range of an ordinary ratio between an area of a cell and an area of one or more characters in an ordinary table. It should be noted that the character area and its circumscribed rectangle can be identified using a labeling process or the like.

If in Step S28 it is identified that at least one of the halftone dot cells including a character has the area ratio out of the predetermined range, then the specific halftone dot area detecting unit 22 identifies whether regarding every halftone dot cell including a character, halftone dots in the cell including a character have substantially uniform luminance and hue or not (in Step S29).

If (a) in at least one halftone dot cell including a character, the outside of the character is partially not a halftone dot area (in Step S27), (b) in at least one halftone dot cell including a character, the cell has the area ratio out of the predetermined range or not (in Step S28), and (c) in every halftone dot cell including a character, halftone dots have substantially uniform luminance and hue or not (in Step S29), then the specific halftone dot area detecting unit 22 determines that this table area includes a specific halftone dot area.

Thus, these conditions exclude an ordinary table that includes a cell that includes a character and a background of halftone dots, not a graph.

After determining that this table area includes a specific halftone dot area, subsequently, the specific halftone dot area detecting unit 22 identifies the character size of a character included in such cell (in Step S30).

The specific halftone dot area detecting unit 22 identifies whether the identified character size is less than a threshold value (in Step S31). If the identified character size is not less than the threshold value, then for this table area, the specific halftone dot area detecting unit 22 causes the encoding unit 23 to use a resolution and an encoding method for a specific halftone dot area (in Step S32). In this process, if the neighborhood area with a predetermined range from this table area includes a character area, then for this character area, the specific halftone dot area detecting unit 22 may cause the encoding unit 23 to use a resolution and an encoding method for a specific halftone dot area.

Contrarily, if the identified character size is less than the threshold value, then the specific halftone dot area detecting unit 22 separates the identified character from such cell, and causes the encoding unit 23 to use respective encoding methods different from each other for the halftone dot area from which the character has been separated and for the character (in Step S33).

If in Step S28 every halftone dot cell including a character has the area ratio in the predetermined range, then a default resolution and a default encoding method for a table area are used as an encoding manner for this table area (in Step S24).

If in Step S29 in at least one halftone dot cell including a character, halftone dots does not have substantially uniform luminance and hue, then a default resolution and a default encoding method for a halftone dot area are used for this table area (in Step S34).

After finishing the process of Step S24, S32, S33 or S34, returning to Step S21, a next table area is selected and processed in the same manner until all table areas extracted in the image are processed in the same manner.

Consequently, if in an image a graph detected as a table area includes a character, then such graph is extracted as a specific halftone dot area, and in the encoding, dropping the image quality of the character is restrained.

In the aforementioned Embodiment 1, the area extracting unit 21 extracts a halftone dot area from an image. The specific halftone dot area detecting unit 22 detects a specific halftone dot area, the specific halftone dot area being the extracted halftone dot area that includes a character and of which a variation range in the distribution of luminance and hue is less than a predetermined range. The encoding unit 23 encodes the specific halftone dot area in an encoding manner different from an encoding manner for the halftone dot area other than the specific halftone dot area, the encoding manner for the specific halftone dot area providing higher image quality after encoding than image quality provided by the encoding manner for the halftone dot area other than the specific halftone dot area.

Therefore, even if a small character in a graph is not extracted as a character area, and a graph including a small character is extracted as a halftone dot area or the like, such graph is encoded using a manner suitable to such small character, and consequently, when independently encoding respective area types of areas in images, dropping the visibility of a small character in a graph is restrained.
Embodiment 2.

In Embodiment 2, an image processing program is stored in a storage device in the aforementioned image forming apparatus, a terminal device or the like or a non-transitory computer readable recording medium. The image processing program causes a computer to act as functions of the image processing apparatus mentioned in Embodiment 1 (i.e. the functions of the area extracting unit 21, the specific halftone dot area detecting unit 22, the encoding unit 23, and the file generating unit 24). The image processing program is read and executed by a computer built in the aforementioned image forming apparatus, a terminal device or the like.

Consequently, in the aforementioned image forming apparatus, a terminal device or the like, the area extracting unit 21, the specific halftone dot area detecting unit 22, the encoding unit 23, and the file generating unit 24 are embodied.

The description has been presented for purposes of illustration and description, and is not intended to be exhaustive or limited.

For example, in the aforementioned Embodiment 1, the process in Step S28 of FIG. 3 may be removed under some conditions.

Further, in the aforementioned Embodiment 1 or 2, Step S5 or S34 may use a resolution and an encoding method different from a resolution and an encoding method for a photograph area (i.e. a gradation area) in an image, instead of a default resolution and a default encoding method. For example, it may be applied that a lossy method is used as an encoding method for a photograph area (i.e. a gradation area) and a loss-less method is used in Step S5 or S34.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image processing apparatus, comprising:
   a computer;
   an area extracting unit, running on said computer, configured to extract a halftone dot area from an image;
   a specific halftone dot area detecting unit, running on said computer, configured to detect a specific halftone dot area, the specific halftone dot area being the extracted halftone dot area that includes a character and of which a variation range in a distribution of luminance and hue is less than a predetermined range; and
   an encoding unit, running on said computer, configured to encode the specific halftone dot area into encoded image data to be stored on said computer; said encoding unit encoding the specific halftone dot area in an encoding manner different from an encoding manner for the extracted halftone dot area other than the specific halftone dot area, the encoding manner for the specific halftone dot area providing higher image quality after encoding at a higher resolution than image quality provided by the encoding manner for the extracted halftone dot area other than the specific halftone dot area wherein:
   the area extracting unit is further configured to extract a table area in the image;
   the specific halftone dot area detecting unit is further configured to detect the specific halftone dot area in the extracted halftone dot area overlapping with the table area; and
   the encoding unit is further configured to encode the table area including the specific halftone dot area in an encoding manner, the encoding manner for the table area including the specific halftone dot area providing higher image quality after encoding at a higher resolution than image quality provided by the encoding manner for the table area not including the specific halftone dot area wherein the encoded image data stored on said computer will be sent to a printer and said printer prints said image.

2. The image processing apparatus according to claim 1, wherein the encoding unit is further configured to encode the specific halftone dot area in an encoding method different from an encoding method for the extracted halftone dot area other than the specific halftone dot area.

3. The image processing apparatus according to claim 1, wherein:
the specific halftone dot area detecting unit is further configured to separate the character from the specific halftone dot area if a character size of the character in the specific halftone dot area is less than a predetermined threshold value; and
the encoding unit is further configured to encode the specific halftone dot area in which the character has been removed and the separated character independently in respective encoding methods different from each other.

4. A non-transitory computer readable recording medium storing an image processing program, the image processing program causing a computer to act as:
an area extracting unit, running on the computer, configured to extract a halftone dot area from an image;
a specific halftone dot area detecting unit, running on the computer, configured to detect a specific halftone dot area, the specific halftone dot area being the extracted halftone dot area that includes a character and of which a variation range in a distribution of luminance and hue is less than a predetermined range; and
an encoding unit, running on the computer, configured to encode the specific halftone dot area into encoded image data to be stored on said computer; said encoding unit encoding the specific halftone dot area in an encoding manner different from an encoding manner for the extracted halftone dot area other than the specific halftone dot area, the encoding manner for the specific halftone dot area providing higher image quality after encoding at a higher resolution than image quality provided by the encoding manner for the extracted halftone dot area other than the specific halftone dot area wherein:
the area extracting unit is further configured to extract a table area in the image;
the specific halftone dot area detecting unit is further configured to detect the specific halftone dot area in the extracted halftone dot area overlapping with the table area; and
the encoding unit is further configured to encode the table area including the specific halftone dot area in an encoding manner, the encoding manner for the table area including the specific halftone dot area providing higher image quality after encoding than image quality provided by the encoding manner for the table area not including the specific halftone dot area wherein the encoded image data stored on said computer will be sent to a printer and said printer prints said image.

* * * * *